United States Patent [19]
Berndt

[11] Patent Number: 5,309,510
[45] Date of Patent: May 3, 1994

[54] DOOR INTERCOM DEVICE

[75] Inventor: Christian H. Berndt, Calgary, Canada

[73] Assignee: Hunterwood Holdings Ltd., Calgary, Canada

[21] Appl. No.: 940,653

[22] Filed: Sep. 4, 1992

[51] Int. Cl.$^5$ .......................... H04M 1/60; H04B 3/00
[52] U.S. Cl. ....................................... 379/167; 381/81
[58] Field of Search ................... 379/167, 386; 381/80, 381/81; D14/159

[56] References Cited

U.S. PATENT DOCUMENTS

| | | | |
|---|---|---|---|
| 4,584,436 | 4/1986 | Boenning et al. | 379/167 X |
| 4,809,320 | 2/1989 | Hawkins | 379/167 |
| 4,894,858 | 1/1990 | Collingwood | 379/167 |

FOREIGN PATENT DOCUMENTS

90/05433  5/1990  PCT Int'l Appl. .

Primary Examiner—Stephen Chin
Assistant Examiner—Paul Loomis
Attorney, Agent, or Firm—Jerry T. Kearns

[57] ABSTRACT

A door intercom device for allowing a dwelling occupant to easily converse with an individual disposed on an exterior side of a dwelling door includes a thin sheet metal mounting bracket possessing a generally U-shaped clamp portion dimensioned to engage over the top edge of a conventional swinging door. An elongated interior portion of the bracket includes a terminal end portion upon which a master station of a two-station intercom system is mounted. A suction cup on a rear face of the terminal end portion of the mounting bracket secures the device in place on the interior face of a door. A second station of the intercom system is secured on a short leg portion of the U-shaped clamp, on an exterior face of the door. Electrical wiring connecting the intercom stations extends along the rear face of the mounting bracket, protected within an overfolded bead portion. The door intercom device may be easily installed on a conventional door in a matter of seconds, without the need for any modification to the door or dwelling structure, and without the use of any tools.

20 Claims, 3 Drawing Sheets

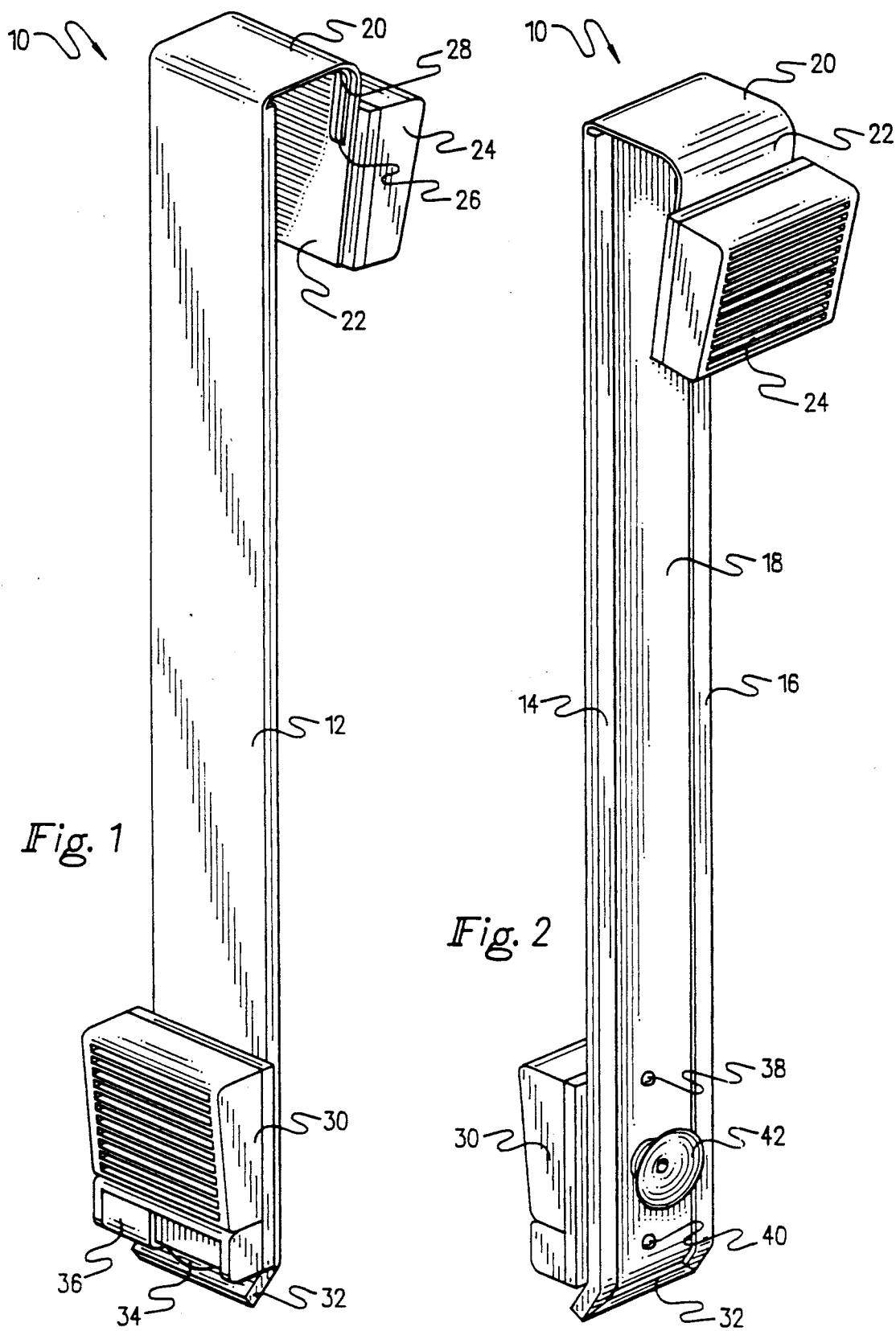

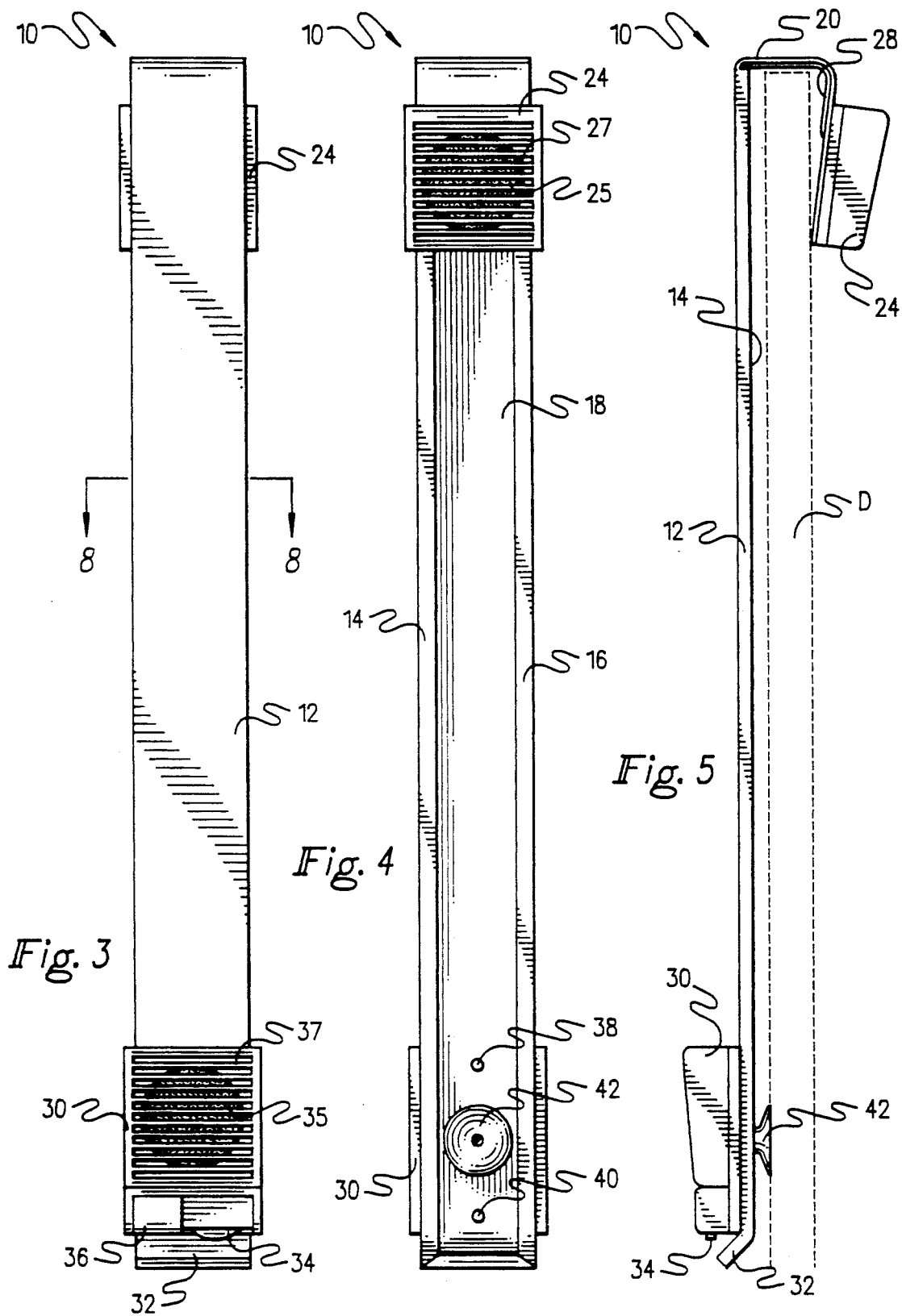

5,309,510

DOOR INTERCOM DEVICE

BACKGROUND OF THE INVENTION

1. Field of the Invention

The present invention relates to door intercom devices, and more particularly pertains to a door intercom device of the type adapted to provide an additional measure of security to the occupants of a residential or commercial dwelling. A common mode employed by criminals to perpetrate robbery as well as other more serious crimes involves ringing the doorbell of a dwelling, or knocking upon the door. The criminal then initiates a conversation with the dwelling occupant, necessitating a slight opening of door by the occupant to facilitate the conversation. At this point, the criminal throws their weight against the door, forcing the door open and allowing easy access to the dwelling. In an attempt to overcome this problem, a variety of locking devices have been proposed in the prior art which allow the door to be only slightly open. The most common of these locks, a chain-type device, employs a relatively small sized chain having an end portion removably attachable in a bracket secured either to the door or the door frame. A typical method of securement is by the use of relatively small sized screws. Accordingly, when the criminal throws their weight against the door, the typical chain locking devices are either broken or the locking chain mounting brackets are torn from the door or door frame. Thus, there is a need for a more secure manner of allowing a dwelling occupant to conduct a conversation with an individual disposed on the exterior side of a door.

2. Description of the Prior Art

A variety of intercom systems are known in the prior art for allowing a dwelling occupant to converse with an individual located remotely of the building, or the dwelling door. These conventional intercom systems require a great deal of work to install, frequently necessitating modification of the dwelling door and the installation of wiring through the exterior dwelling structure. As a result, such conventional intercom systems are relatively expensive, and impossible to transport to another location after initial installation.

SUMMARY OF THE INVENTION

In order to overcome these problems, the present invention provides an improved door intercom device for allowing a dwelling occupant to easily converse with an individual disposed on an exterior side of a dwelling door which includes a thin sheet metal mounting bracket possessing a generally U-shaped clamp portion dimensioned to engage over the top edge of a conventional swinging door. An elongated interior portion of the bracket includes a terminal end portion upon which a master station of a two-station intercom system is mounted. A suction cup on a rear face of the terminal end portion of the mounting bracket secures the device in place on the interior face of a door. A second station of the intercom system is secured on a short leg portion of the U-shaped clamp, on an exterior face of the door. Electrical wiring connecting the intercom stations extends along the rear face of the mounting bracket, protected within an overfolded bead portion. The door intercom device may be easily installed on a conventional door in a matter of seconds, without the need for any modification to the door or dwelling structure, and without the use of any tools.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is a front perspective view illustrating the door intercom device of the present invention.

FIG. 2 is a rear perspective view illustrating the door intercom device of the present invention.

FIG. 3 is a front plan view illustrating the door intercom device of the present invention.

FIG. 4 is a rear plan view illustrating the door intercom device of the present invention.

FIG. 5 is a side elevational view illustrating the door intercom device, as mounted on a conventional door depicted in a phantom line.

DETAILED DESCRIPTION OF THE PREFERRED EMBODIMENT(S)

Figure 8:
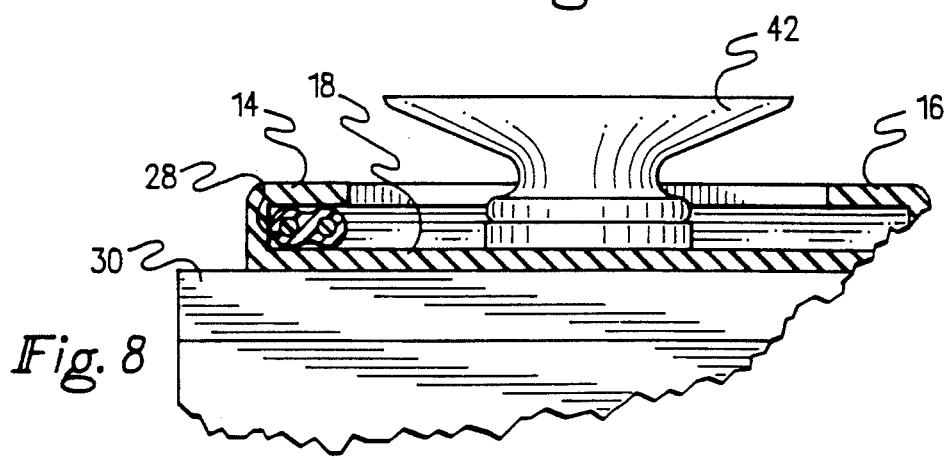
FIG. 8 is a partial cross-sectional detail view illustrating the door intercom electrical wire disposed in a bead portion of the mounting bracket of the door intercom device of the present invention.

Referring now to the drawings, wherein like reference numerals designate corresponding structure throughout the views, and referring in particular to FIGS. 1 through 5, a door intercom device 10 according to a first preferred embodiment of the invention will now be described. The door intercom device 10 includes a mounting bracket, preferably formed from a relatively thin sheet metal material such as steel, which includes an elongated rectangular portion 12 possessing on a rear face overfolded juxtaposed longitudinally extending bead portions 14 and 16 defining an interior rectangular channel portion 18. The mounting bracket terminates at an upper end in a generally U-shaped clamp portion possessing a thin metal rectangular top wall 20 adapted to overlie the top edge of a conventional swinging door, while still allowing the door to open, close, and lock in the usual manner. The clamp portion also includes an inwardly converging wall portion 22 integrally connected with the remainder of the mounting bracket by an acute angle radiused bend portion. The mounting bracket wall portions 20 and 22 are dimensioned and disposed such that a frictional clamping engagement with a conventional swinging dwelling door is provided. Due to the elastically deformable characteristics of the sheet metal material forming the mounting bracket, the bracket can be easily and quickly installed and subsequently removed, in a matter of a few seconds, without the need for any tools. A second or so-called "slave" station 24 of an intercom system is substantially permanently secured through the use of conventional fasteners such as screws, rivets, adhesives, etc., to the outward face of the terminal clamp wall portion 22. Electrical wiring 28 for the intercom system extends from the station 24 through an aperture 26 formed through the wall portion 22 and along the rear face of the elongated bracket portion 12, within the overfolded bead 14. As can be appreciated from FIG. 8, the electrical wiring 28 is disposed within the bead 14 in a substantially enclosed and protected environment to prevent damage through tampering, vandalism, exposure to weather, or abrasion with the door or door frame. The electrical wiring 28 extends substantially entirely along and within the bead 14, through an aperture (not shown) adjacent an interior terminal end portion of elongated bracket portion 12, and into operative connection with a so-called "master" station of the intercom system 30, adapted to be disposed on the interior side of a swinging-type door. An interior terminal end portion 32 of the elongated mounting bracket portion 12 inclines forwardly at an acute angle, forming a backing strip for a control portion of the master station 30. Typical controls of the master station include an ON/OFF volume control dial 34, and a TALK/LISTEN button 36. Such intercom systems and their internal components and circuitry are of course well known to those of ordinary skill in the art and need not be further described herein for a full and complete understanding of the present invention.

As best seen in FIG. 2, the master station 30 may be secured to the lower terminal portion of elongated bracket portion 12 by the use of conventional fasteners, for example rivets 38 and 40. In order to prevent the mounting bracket from flexing away from the door, or slapping the door when the door is slammed, a conventional suction cup 42 is mounted on the rear channel portion 18, and is adapted to affect the securement of the bracket with the interior face of a conventional swinging-type door.

As can be appreciated with reference to FIGS. 3 and 4, the master 30 and slave 24 stations of the intercom system are preferably provided with respective speakers 35 and 25 protected by corresponding substantially weather-proof grills 37 and 27 to allow trouble free operation in adverse weather conditions.

Figures 6, 7:
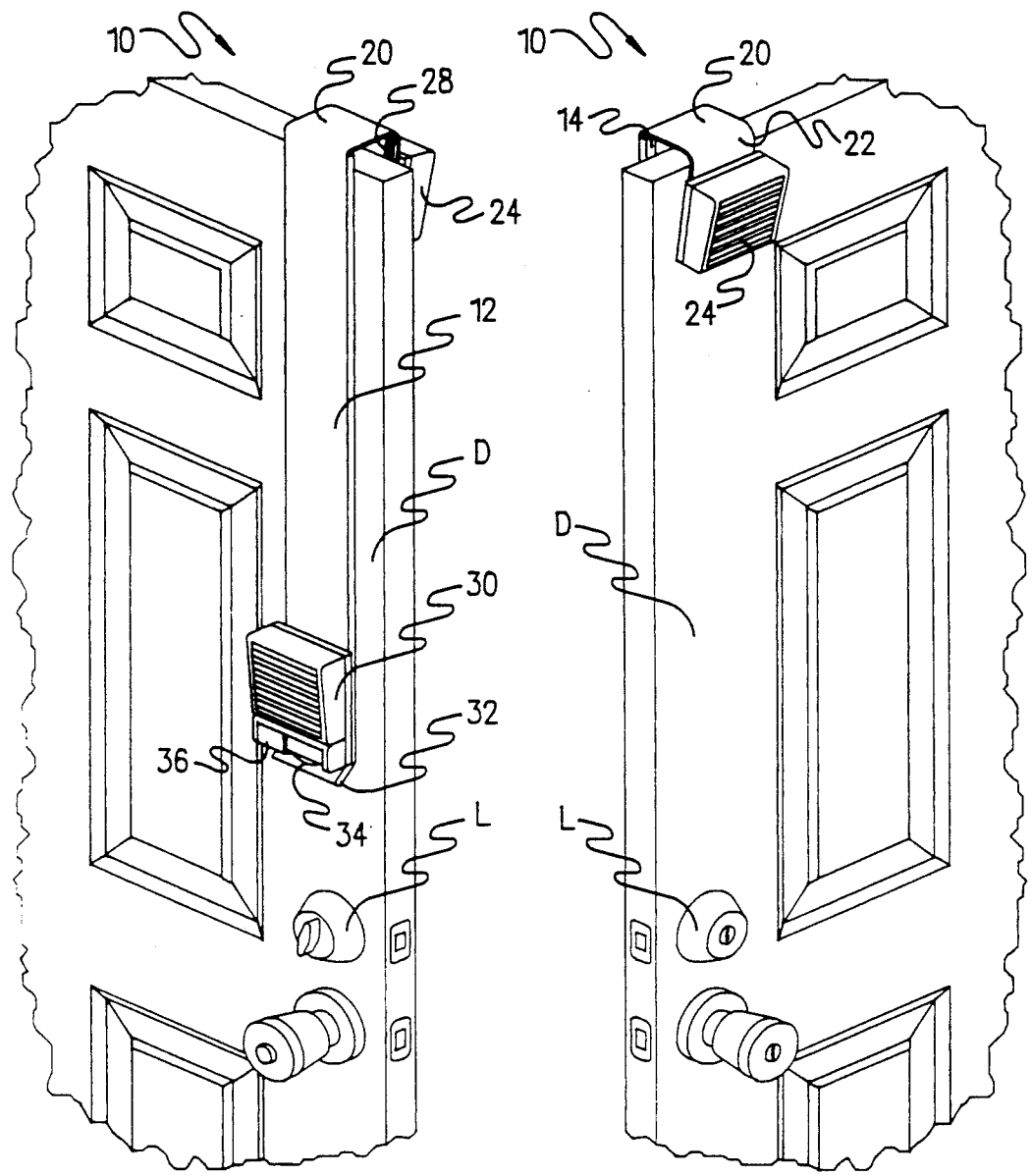
FIG. 6 is a perspective view illustrating the door intercom device of the present invention installed on a conventional door, depicting the interior side of the door.
FIG. 7 is a perspective view illustrating the door intercom device of the present invention installed on a conventional door, depicting the exterior side of the door.

With reference to FIGS. 4, 6, and 7, the door intercom device 10 of the present invention may be easily and quickly installed over the top edge of a conventional door D by merely slightly outwardly expanding the exterior terminal U-shaped inwardly converging clamp wall portion 22, slipping the device over the top edge of the door, and thereafter releasing the clamp portion 22 whereupon the sheet metal bracket will spring back to its original position, affecting a spring type frictional engagement with the top edge of the door D. As shown in FIG. 6, master station 30 will preferably be disposed at a convenient location on the interior face of the door D, slightly above the conventional dead-bolt type locking device L. As an example suitable for use with typical standard doors D, the elongated mounting bracket portion 12 preferably has a length of about 28 inches. When an individual knocks or rings the doorbell of the dwelling, the interior occupant turns on the on/off volume control dial 34, then depresses the TALK/LISTEN button 36 to make an initial inquiry of the caller. After releasing the TALK/LISTEN button 36, the interior occupant listens to the response of the caller.

As shown in FIG. 7, the second or slave station of the intercom system is disposed adjacent the top edge of the door D, to minimize the possibility of damage from vandalism or tampering. A particularly important advantage of the present invention, the interior room occupant need not unlock the dead-bolt lock L in order to easily conduct a conversation to an extent necessary to satisfy the dwelling occupant as to the identity and legitimate purposes of the caller.

As can be readily understood with reference to the foregoing description and accompanying drawings, the intercom system 10 of the present invention is easily portable and may be rapidly installed in a few seconds, without the need for any tools. Accordingly, the device can be carried on trips for use on hotel room doors, and may easily be transported from office to office, without requiring any expensive installation or replacement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A door intercom device, comprising:
    a mounting bracket including an interior portion adapted to be disposed on an interior face of a conventional swinging door, and an exterior portion adapted to be disposed on an exterior face of a conventional swinging door;
    a master intercom station secured to said interior portion of said mounting bracket;
    a slave intercom station secured to said exterior portion of said mounting bracket;
    electrical wiring operatively connecting said master and slave intercom stations; and
    a protective bead portion on said mounting bracket substantially enclosing and protecting said electrical wiring to substantially prevent damage from weather, abrasion, tampering, and vandalism.

2. The door intercom device of claim 1, wherein said mounting bracket includes a substantially U-shaped clamping portion dimensioned for releasable frictional engagement with an upper edge portion of a conventional swinging-type door.

3. The door intercom device of claim 1, wherein said mounting bracket is formed from sheet metal material.

4. The door intercom device of claim 1, further comprising a suction cup on a rear face of said mounting bracket for securing said mounting bracket to an interior face of a swinging-type door.

5. The door intercom device of claim 1, wherein said mounting bracket includes an elongated portion dimensioned to dispose said master intercom station at a convenient elevation above a conventional door lock on an interior face of a swinging-type door.

6. A door intercom device adapted for mounting over a top edge of a conventional swinging-type door, comprising:
    a mounting bracket including an elongated interior portion dimensioned to dispose a master station of an intercom system at a convenient elevation above a conventional lock of a swinging-type door;

said elongated portion terminating at an upper end in a resilient U-shaped clamp portion possessing an exterior wall portion mounting a slave station of an intercom system thereon; and electrical wiring operatively connecting said master and slave stations of said intercom system disposed within a protected bead on a rear face of said mounting bracket to substantially prevent damage from weather, abrasion, tampering, and vandalism.

7. The door intercom device of claim 6, further comprising a suction cup disposed on a rear face of said elongated portion adjacent said master intercom station for securing said mounting bracket to an interior face of a conventional swinging type door.

8. The door intercom device of claim 6, wherein said mounting bracket is formed from a sheet metal material.

9. The door intercom device of claim 8, wherein said sheet metal material comprises steel or aluminum.

10. The door intercom device of claim 6, further comprising an inwardly acutely angled backing portion on a terminal end portion of said mounting bracket disposed adjacent and behind a control portion of said master intercom station.

11. The door intercom device of claim 6, wherein said master and slave intercom stations are operably connected for activation when the swinging-type door is in a closed and locked condition.

12. A door intercom device adapted for mounting over a top edge of a conventional swinging-type door, comprising:

a mounting bracket including a resilient substantially U-shaped clamp portion dimensioned to be received over a top edge of a conventional swinging-type door while still allowing the door to open, close, and lock in a conventional manner;

said mounting bracket including an elongated interior leg portion;

a master station of an intercom system mounted on a lower terminal portion of said interior leg portion;

said interior leg portion depending downwardly from said clamp and dimensioned to dispose said master station at a convenient elevation above a conventional lock of a swinging-type door;

said mounting bracket including an exterior leg portion;

a slave station of an intercom system mounted on said exterior leg portion;

said exterior leg portion having a length substantially less than a length of said interior leg portion for disposing said slave station adjacent a top edge of a swinging type door to minimize potential vandalism and tempering; and electrical wiring operatively connecting said master and slave stations of said intercom system.

13. The door intercom device of claim 12, further comprising a suction cup disposed on a rear face of said interior leg portion adjacent said master intercom station for securing said mounting bracket to an interior face of a conventional swinging-type door.

14. The door intercom device of claim 12, wherein said mounting bracket is formed from a sheet metal material.

15. The door intercom device of claim 14, wherein said sheet metal material comprises steel or aluminum.

16. The door intercom device of claim 12, further comprising an inwardly acutely angled backing portion on a terminal end portion of said mounting bracket disposed adjacent and behind a control portion of said master intercom station.

17. The door intercom device of claim 12, wherein said master and slave intercom stations are operably connected for activation when the swinging-type door is in a closed and locked condition.

18. The door intercom device of claim 12, further comprising a protective bead portion on said mounting bracket substantially enclosing and protecting said electrical wiring to substantially prevent damage from weather, abrasion, tampering, and vandalism.

19. The door intercom device of claim 18, wherein said protective bead portion comprises at least one longitudinally extending overfolded edge portion on said mounting bracket.

20. The door intercom device of claim 18, wherein said mounting bracket includes a pair of overfolded juxtaposed longitudinally extending bead portions.

* * * * *